Patented Oct. 17, 1950

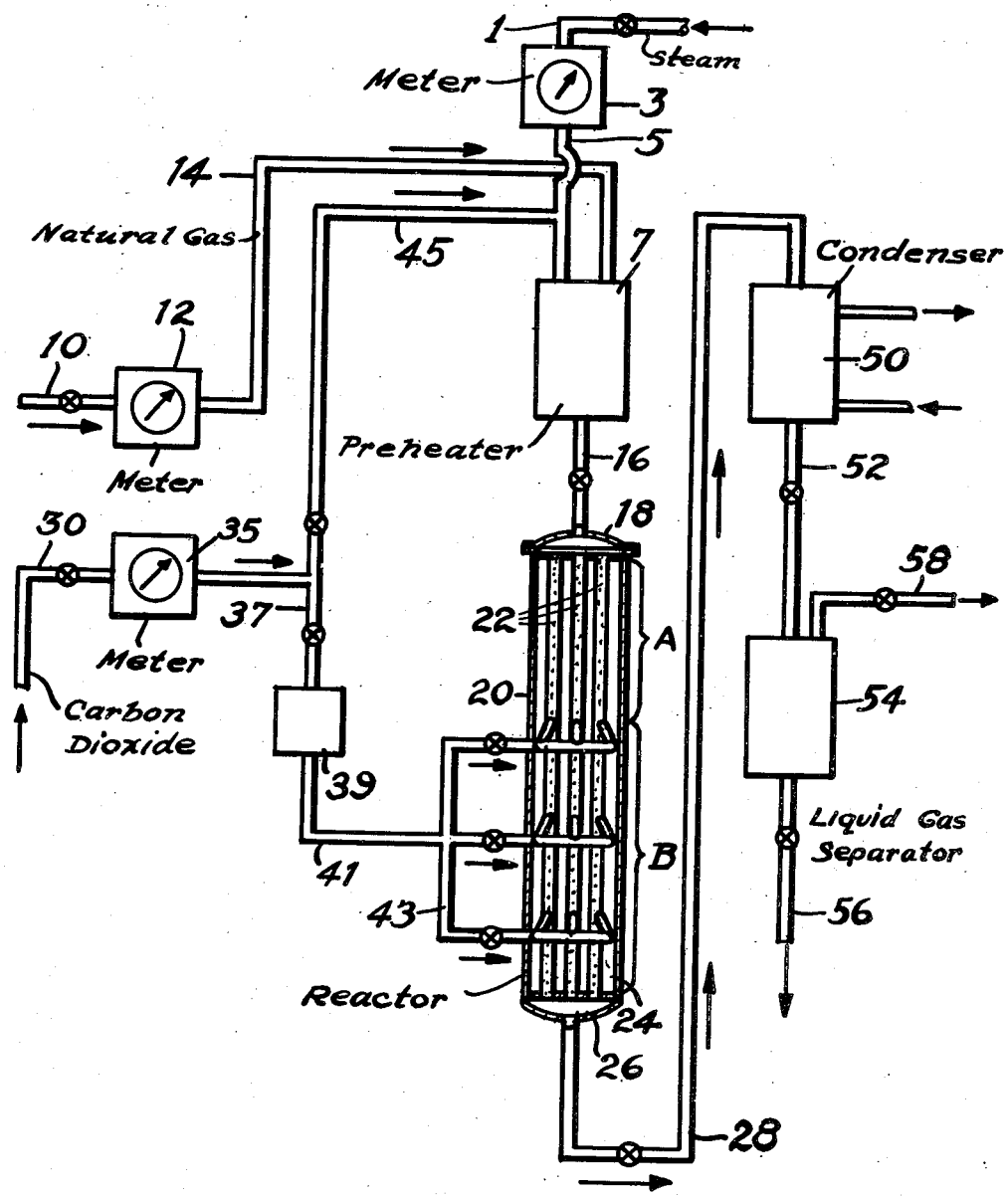

2,526,521

UNITED STATES PATENT OFFICE 2,526,521

PRODUCTION OF GAS MIXTURES CONTAINING CO AND H₂

Alexis Voorhies, Jr., East Baton Rouge, La., assignor to Standard Oil Development Company, a corporation of Delaware Application May 29, 1948, Serial No. 30,134

6 Claims. (Cl. 48—196)

1

The present invention relates to an improved process for producing gas mixtures containing CO and $H_2$ from hydrocarbon gases by reaction with steam and $CO_2$ in the presence of a suitable catalyst. More specifically the invention relates to a method for preventing coke formation on the catalyst of this process particularly when used for the production of gas mixtures suitable as feed gases for the catalytic synthesis of normally liquid hydrocarbons and other valuable products from CO and $H_2$.

The present invention will be fully understood from the following description read with reference to the accompanying drawing which is a flow plan indicating the manner in which conventional apparatus may be adapted to the purposes of the invention.

In recent years it has become desirable to manufacture gas mixtures containing CO and $H_2$, in large volumes to supply the needs of the rapidly developing synthetic oil production from CO and $H_2$.

The hydrocarbon synthesis requires feed gas mixtures having a $H_2$:CO ratio of about 0.5–3. It has long been known that gas mixtures containing $H_2$ and CO in these proportions may be produced from hydrocarbon gases such as methane in the form of natural gas or other readily available hydrocarbon gas mixtures, by a conversion with steam and $CO_2$ in varying proportions at temperatures of about 900°–1700° F. on a relatively long and narrow, externally heated column of suitable catalysts such as nickel associated with difficultly reducible oxides such as magnesia, silica, and/or alumina, according to the following reactions:

$$CH_4 + H_2O \rightleftharpoons CO + 3H_2 \quad (1)$$
$$CH_4 + CO_2 \rightleftharpoons 2CO + 2H_2 \quad (2)$$
$$CO + H_2O \rightleftharpoons CO_2 + H_2 \quad (3)$$

The above equations show that the $H_2$:CO ratio of the product gas may be increased by increasing the steam content in the feed so as to shift equilibrium Reaction 1 to the right and/or Reaction 3 to the left. An increase of the $CO_2$ content of the feed will increase the CO content of the product gas in accordance with Reactions 2 and 3. Theoretically, therefore, gas mixtures containing CO and $H_2$ in any desirable synthesis feed gas ratio may be produced merely by determining the $H_2O$:$CO_2$ feed gas ratio most favorable to the production of CO and $H_2$ in the desired ratio and contacting a feed gas having this favorable ratio with methane or the like at suitable temperatures on the catalysts mentioned above.

2

In practice, however, a serious difficulty can arise from the formation of carbon which deactivates the catalyst, increases pressure drop and impedes the heat supply to the strongly endothermic reaction, resulting in frequent interruptions of the process. This carbon formation is due chiefly to a combination of the following reactions:

$$2CO = CO_2 + C \quad (4)$$
$$CH_4 = 2H_2 + C \quad (5)$$

Carbon formation may be suppressed by an increase of the $H_2O$ concentration in the feed whereby Reactions 1 and 3 are favored to proceed from left to right with the effect that CO and $CH_4$ will form $H_2$ and carbon oxide rather than carbon in accordance with Reactions 4 and 5. The use of excess steam actually is an effective means of suppressing carbon formation, which has been long practiced in the conventional catalytic reformation of methane with steam alone. However, the application of this means to the production of synthesis feed gas of a desired $H_2$:CO ratio has the obvious drawback that any increase in the steam concentration will result in a corresponding increase in the $H_2$:CO ratio of the product gas in accordance with Equations 1 and 3. It follows that whenever the steam concentration is increased to prevent carbon formation a corresponding amount of $CO_2$ must be added to promote Reaction 3 in the direction from the right to the left.

It should be understood that this presentation of the reaction mechanism is a simplification of the actual conversion mechanism, particularly in view of the fact that the rate and extent of the individual reactions mentioned are highly temperature sensitive. Therefore, in order to prevent carbon formation, the $H_2$:$CO_2$ ratio in the feed gas must be correlated with the temperature.

These conditions result in the requirement of a large excess of steam and $CO_2$ in the reaction zone. On the other hand the use of such a large excess of reactants substantially increases the cost of utilities and $CO_2$ removal from the product gas and the amount of sensible heat required for the process. This excess should therefore be kept at the possible minimum which will be just sufficient for an effective suppression of carbon formation.

Prior to the present invention, it had been found that at relatively high temperatures of about 1300°–1600° F. $CO_2$ suppresses carbon formation probably in accordance with Equation 4. At temperatures of about 1500°–1600° F. $CO_2$ becomes even equivalent to $H_2O$ with respect to carbon suppression. Consequently, a substantial portion of the excess steam required for carbon suppression may be replaced by $CO_2$. Thus, less total excess oxygen in the form of $H_2O$ and $CO_2$ is required for carbon suppression and adjustment of the $H_2$:CO ratio at operating temperature within the range specified above. Actually, about 60% total excess oxygen for example 0.6 mol total $CO_2$+1.15 mol total $H_2O$/1 mol $CH_4$ at 1500° F. for the production of a gas having an $H_2$:CO ratio of 2, and for example 1.6 mol total $CO_2$+0.6 mol total $H_2O$/1 mol $CH_4$ at 1500° F. for an $H_2$:CO ratio of 1, have been used successfully for the prevention of carbon formation. This excess oxygen figure is based on the assumption of one effective oxygen atom in the $CO_2$ molecule in the prevention of carbon formation.

It has been possible by the procedure described above considerably to reduce carbon formation in the reactor and substantially to extend the intervals between interruptions caused by the necessity of carbon removal. However, substantial amounts of carbon are still formed particularly on the catalyst layers close to the feed gas entry, necessitating interruptions of higher frequencies than are desirable for economic operation. A further suppression or complete elimination of carbon formation is therefore still a major problem in the catalytic production of synthesis gas by the reformation of hydrocarbon gases with steam and $CO_2$. The present invention affords a simple means for solving this problem.

More recently it has been shown[1] that at lower temperatures, particularly at temperatures below 1175° F., $CO_2$ not only fails to suppress carbon formation but actually causes the deposition of carbon. It has now been found that this fact is the cause of the carbon formation still observed on the catalyst layers closest to the feed gas entry. The process is normally so operated that the feed gas passes downwardly through a relatively high column of catalyst heated externally. In order to avoid excessive temperatures the optimum temperature of about 1300°–1700° F., depending on the chosen composition of feed and product gases, must be reached in the catalyst layers close to the reactor outlet. Consequently the feed gases must pass through the upper catalyst layers at considerably lower temperatures of about 900°–1100° F. which are conducive to carbon formation caused by the presence of $CO_2$.

In accordance with the present invention this difficulty may be practically completely eliminated by feeding at least a substantial portion of the $CO_2$ required to establish a desired $H_2$:CO ratio and to secure non-coking operation with low excess oxygen, to a catalyst zone having a temperature substantially in excess of 1175° F. and preferably in excess of about 1200°–1300° F.

[1] Reitmeier et al.: "Production of Synthesis Gas by Reacting Light Hydrocarbons with Steam and Carbon Dioxide." Joint Symposium on Production of Synthesis Gas, A. C. S., N. Y., N. Y., Sept. 15–19, 1947, pp. 85 et seq.

In this manner, the $CO_2$ concentration may be held at a minimum in those reactor portions in which temperatures prevail which are conducive to the promotion of carbon formation by $CO_2$, while at the same time sufficient $CO_2$ is made available in those reactor portions in which $CO_2$ is required to suppress carbon formation from CO produced on preceding catalyst layers and to reduce the $H_2$ content of the gas produced on preceding catalyst layers, in accordance with Reactions 3, 4 and 5. These advantages may be secured without any increase in the total excess oxygen required.

The catalysts normally used in the conventional reformation of hydrocarbon gases such as methane may be employed in the process of the invention. Specific examples of catalysts of this type are composed of about 20% nickel in combination with kaolin, alumina and/or magnesia. Other reaction conditions are likewise those of conventional operation.

In accordance with the preferred embodiment of the invention the entire $CO_2$ requirement of the process is supplied to catalyst zones having temperatures substantially above 1175° F. The $CO_2$ supply may be split over these zones in such a manner that additional $CO_2$ is made available at the rate at which it is required to maintain optimum conditions in all high temperature catalyst zones. If desired, a minor proportion say about 5–10%, or less, of the total $CO_2$-requirement may be added to hydrocarbon gas and/or steam prior to their entering into the top of the reactor.

Suitable compositions of the feed to the various catalyst zones are as follows:

| Desired $H_2$:CO Ratio | 0.5 | | 1 | | 2 | |
|---|---|---|---|---|---|---|
| Catalyst Temp. Zones, degrees | 900–1300 | 1300–1500 | 900–1300 | 1300–1500 | 900–1300 | 1300–1500 |
| $CH_4$, mols | 1 | | 1 | | 1 | |
| $H_2O$, mol/mol $CH_4$ | 0.5 | | 0.6 | | 1.15 | |
| $CO_2$, mol/mol $CH_4$ | | 4 | | 1.6 | | 0.6 |

The invention will be best understood from the following description of the drawing.

Referring now in detail to the drawing, the system illustrated therein comprises as its essential element a conventional tube reformer 20 formed by a plurality of elongated relatively narrow vertical catalyst tubes 22 which are arranged in a heating jacket 24. Heat may be supplied to heating jacket 24 by electrical means, direct firing, hot flue gases, or in any other suitable manner (not shown). Tubes 22 may be filled with a pelleted catalyst containing 20% nickel supported on a mixture of alumina and kaolin. The operation of this reformer in accordance with the invention will now be explained using as an example the production of a synthesis gas having an $H_2$:CO of about 1, from natural gas containing about 90–95% methane. It should be understood, however, that product gases of different composition may be produced in a substantially analogous manner from the same or different hydrocarbon gases.

In operation steam from any desired source may be supplied from line 1 to a metering device 3, and then through line 5 to a preheater 7.

Natural gas preferably desulfurized and containing about 92% methane may be supplied from line 10 passed through a suitable metering device 12 and then supplied through line 14 to a preheater 7 wherein it is mixed with the steam supplied from line 5. For the purposes of the present example the feed rates of natural gas and steam should be so controlled that the mixture in preheater 7 contains about 0.5–0.7 mols of steam per mol of $CH_4$ in the natural gas.

The natural gas-steam mixture may be heated in preheater 7 up to about 1000° F. by electrical or gas firing means. It is noted, however, that in accordance with the present invention, a low degree of preheat is sufficient and preheating may even be omitted completely, since the danger of carbon formation in the upper catalyst zone is eliminated.

The preheated mixture of natural gas and steam enters the top of reactor tubes 22 through line 16 and manifold header 18. The feed rate may be controlled at about 100 v./v./hour of $CH_4$ in the upper catalyst zone A of tubes 22.

At a maximum tube wall temperature of tubes 22 of about 1600°–1800° F. which is required for establishing optimum catalyst temperatures of about 1400°–1500° F. in the intermediate and lower catalyst zone B at the flow conditions specified, the catalyst in zone A reaches a maximum temperature of about 1100°–1300° F. at which formation of $H_2$ and $CO$ begins without any carbon formation.

Upon entering the lower catalyst zone B which is at a temperature above 1300° F. and beyond the range of $CO_2$- promoted carbon formation the reactants are admixed with $CO_2$ in a total amount of about 1.5–1.7 mols of $CO_2$ per mol of $CH_4$ originally supplied. This $CO_2$ may be supplied to the system from line 30, metered in flow meter 35 and passed on through line 37 to preheater 39 in which it may be preheated to a temperature of about 1300°–1500° F. by electrical or gas firing means. The preheated $CO_2$ flows through line 41 to manifold 43 through which it may be put into catalyst zone B at one or more points as indicated on the drawing. If desired, a minor portion, say about 5 to 10% of the total $CO_2$ supplied through line 37 may be passed through line 45 to line 5 to enter preheater 7 together with the steam.

Product gas having an $H_2$:$CO$ ratio of about 1 is withdrawn from the bottom of tubes 22 through a manifold header 26 and may be passed through line 28 to a condenser 50 wherein condensable constituents, mainly excess steam are condensed. Gas and condensate pass through line 52 to a gas-liquid separator 54. Liquid is withdrawn downwardly from separator 54 through line 56 to be drained. Product gas is withdrawn overhead from separator 54 through line 58. It may have a composition, about as follows:

| | Per cent |
|---|---|
| $CO_2$ | 15 |
| $CO$ | 41 |
| $H_2$ | 41 |
| $CH_4$ | 2 |
| $N_2$ | 1 |

This gas may be subjected to any suitable $CO_2$ removal by caustic scrubbing or the like in conventional equipment (not shown). The make gas is then ready for use in synthesis operation or for any other desired purpose.

The system illustrated by the drawing permits of many modifications which may be obvious to those skilled in the art without a deviation from the spirit and scope of the invention. For instance steam supply and heating means other than those shown may be used.

The foregoing description and exemplary operations have served to illustrate specific embodiments and applications of the invention, but are not intended to be limiting in any way. Only such limitations should be imposed on the invention as are indicated in the appended claims.

What is claimed is:

1. In the process of producing gas mixtures containing $H_2$ and $CO$ in proportions suitable for the catalytic synthesis of hydrocarbons, by passing hydrocarbon gases with steam and $CO_2$ in amounts corresponding to a substantial excess of oxygen at temperatures of about 900° to 1700° F. through an extended catalyst column the temperature of which increases in the direction of the gas flow, the improvement which comprises introducing at least a substantial portion of the total $CO_2$ requirement of the process into a portion of said column, substantially removed in said direction from the feed point of said hydrocarbons and having a temperature substantially above 1175° F.

2. The process of claim 1 in which said column portion has a temperature above about 1200°–1300° F.

3. The process of claim 1 for the production of a gas mixture containing $H_2$ and $CO$ in the approximate ratio of 1 from a gas consisting essentially of methane in which said total $CO_2$ requirement is about 1.5–1.7 mols per mol of methane and said total $CO_2$ requirement is substantially completely supplied to said column portion.

4. The process of claim 1 for the production of a gas mixture containing $H_2$ and $CO$ in the approximate ratio of 2 from a gas consisting essentially of methane, in which said $CO_2$ requirement is about 0.5–0.7 mol of $CO_2$ per mol of methane and said total $CO_2$ requirement is substantially completely supplied to said column portion.

5. The process of claim 1 in which said substantial portion of the total $CO_2$ is supplied to at least two points spaced in said direction of gas flow.

6. The process of claim 1 in which a minor proportion of the total $CO_2$ requirement is supplied to a portion of the catalyst having a temperature not substantially exceeding 1175°.

ALEXIS VOORHIES, JR.

No references cited.